United States Patent [19]
Hoff

[11] 3,759,111
[45] Sept. 18, 1973

[54] HIGH SPEED VARIABLE RATIO PULLEY

[75] Inventor: Stephen J. Hoff, Richmond, Ind.

[73] Assignee: Hoffco Inc., Richmond, Ind.

[22] Filed: Feb. 5, 1973

[21] Appl. No.: 329,721

Related U.S. Application Data

[63] Continuation-in-part of Ser. No. 202,270, Nov. 26, 1971, abandoned.

[52] U.S. Cl. .......................................... 74/230.17 E
[51] Int. Cl. ............................................. F16h 35/52
[58] Field of Search ............................ 74/230.17 E; 192/105 C, 89 W

[56] References Cited
UNITED STATES PATENTS

| | | | |
|---|---|---|---|
| 3,605,510 | 9/1971 | Laughlin | 74/230.17 E |
| 3,605,511 | 9/1971 | Deschene | 74/230.17 E |
| 3,230,787 | 1/1966 | Siegel | 74/230.17 E |
| 3,597,987 | 8/1971 | Kiekhoefer | 74/230.17 E |
| 3,727,478 | 4/1973 | Erickson, Richards & Deschene | 74/230.17 E |

*Primary Examiner*—Charles J. Myhre
*Assistant Examiner*—R. H. Lazarus
*Attorney*—Thomas P. Jenkins et al.

[57] ABSTRACT

Improved safety and operation is obtained in a high-speed variable ratio pulley having a movable pulley flange which is driven rotatively by torque transmitting engagement between fixed spider arms and drive posts adjacent the periphery of the movable pulley flange, and is thrust axially toward a fixed pulley flange by centrifugal cam levers acting between the movable pulley flange and the spider arms. The drive posts closely straddle the thrust line and are long enough to give clearance for the intended flange movement, and their ends are tied together by a tie plate and a ductile bell housing which also engage an outboard bearing to support the posts and movable pulley flange against tilting. Cam movement of the pulley flange is limited, in one case by providing the cam levers with hooked ends which stop their swing at a point short of thrusting the movable pulley flange into forceful abutment with the fixed pulley flange, and in another case by positioning the tie plate to move as a stop against the ends of the spider, substantially on the cam thrust line. For special applications, the spider is adjustably positioned to provide different cam locations and engaging speeds.

11 Claims, 9 Drawing Figures

Patented Sept. 18, 1973 3,759,111

HIGH SPEED VARIABLE RATIO PULLEY

BACKGROUND OF THE INVENTION

This application is a continuation-in-part of my prior copending application Ser. No. 202,270, filed Nov. 26, 1971, now abandoned.

This invention relates to a high-speed variable-ratio pulley especially adapted for use in snowmobile drives. Such pulleys are connected to the engine shaft and normally operate at high speeds of the order of 6,000 to 8,000 RPM, but may be subjected to much higher speeds, up to 12,000 RPM and more, under circumstances which may occur accidently in normal operations or intentionally in racing operations. The high speed operation products high centrifugal forces which may exceed the strength of the rotating parts and cause the pulley or its actuating and associated mechanism to explode. Violent failure of the high speed pulley not only incurs damage to itself and adjacent mechanism, but involves serious danger to the operator of the snowmobile because the drive pulley is commonly located in proximity to the operator.

It has been proposed to enclose the actuating mechanism in a die-cast bell housing bolted directly to the rear face of the movable pulley flange, as in the Laughlin U.S. Pat. No. 3,605,510 and the Deschene U.S. Pat. No. 3,605,511, and in a commercial snowmobile clutch sold by Polaris Division of Textron Inc. to which said patents are assigned.

The present invention relates to a clutch of the general type of the Polaris clutch and as shown in said patents, but modifies and greatly strengthens the mechanism against centrifugal failure and for better operation, and provides a strong housing. The invention employs a fixed pulley flange mounted on an elongated hub. A movable pulley flange is mounted on a sliding bearing on the hub and has a plurality of pairs of axially extending posts adjacent its periphery on its rear side through which it is rotatively driven by a drive spider fixed on the hub and having arms engaged between the pairs of posts in torque transmitting relation. The movable pulley flange is thrust axially toward the fixed pulley flange by centrifugal weights acting between the movable flange and the spider arms on thrust lines substantially between the posts and straddled by them. In accordance with the present invention, the drive posts are extended sufficiently to allow their full axial movement relative to the spider, and their ends are tied together by a tie plate which also preferably serves to support them from an outboard bearing slidable on the outer end of the hub of the fixed pulley flange. A spring between the outboard bearing and the spider urges the movable assembly away from the fixed pulley flange. The tie plate may be part of or lie against the end wall of a bell housing of strong ductile material which is secured to the drive posts and desirably extends continuously from the outboard bearing to the periphery of the movable pulley flange to brace that flange against distortion and tilting and to fully enclose the actuating mechanism. Thrust of the centrifugal weights is limited by thrust-stop means which stops their action at a point short of thrusting the movable pulley flange into forceful abutment with the fixed pulley flange. The preferred centrifugal weights are cam levers pivoted to the spider arms or, preferably, to the movable pulley flange and reacting against rollers on the other of those elements, and in such case the cam faces may be provided with shaped ends which stop against the reaction rollers, so that further centrifugal force exerted by the lever cams will be taken radially by the rollers and will not produce actuating thrust on the movable pulley flange. Alternatively and preferably, the drive posts are positioned to closely straddle the thrust line and are made of a length which positions the tie plate to move against the ends of the spider arms as the pulley flanges approach fully closed position. With this arrangement, any further cam thrust is taken directly by the tie plate and acts only to stress the closely straddling tie posts in tension, without imposing any substantial bending stress on the pulley flange or the spider.

These and other features of construction shown in the embodiment described below produce improved safety and operation.

BRIEF DESCRIPTION OF THE DRAWINGS

The accompanying drawings illustrate the invention and shows a preferred embodiment. In such drawings.

DETAILED DESCRIPTION OF THE PREFERRED EMBODIMENT

Figure 1:
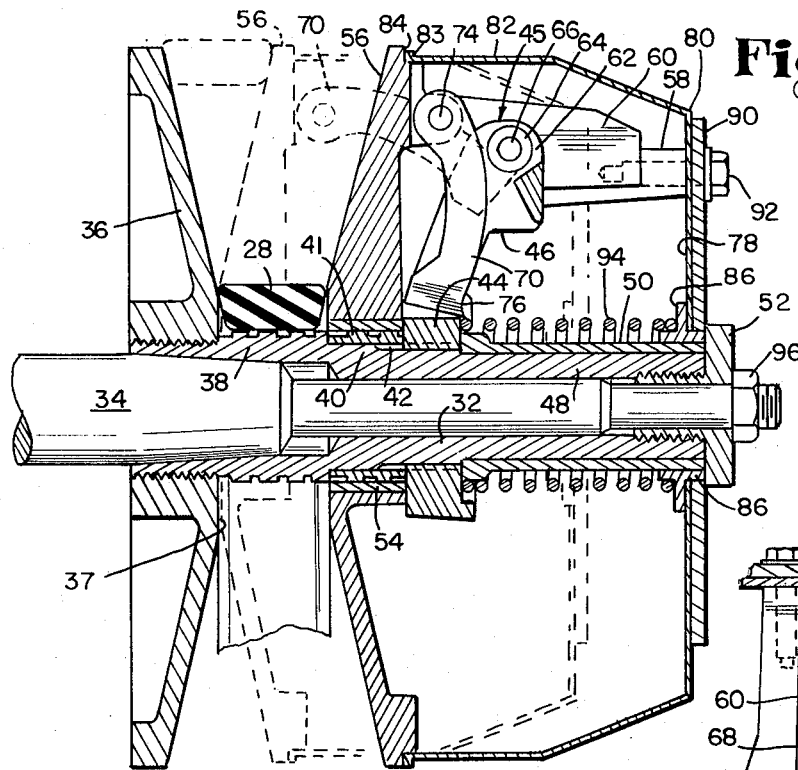
FIG. 1 is an axial section of a variable ratio pulley embodying the invention mounted on a power shaft.
Figure 2:
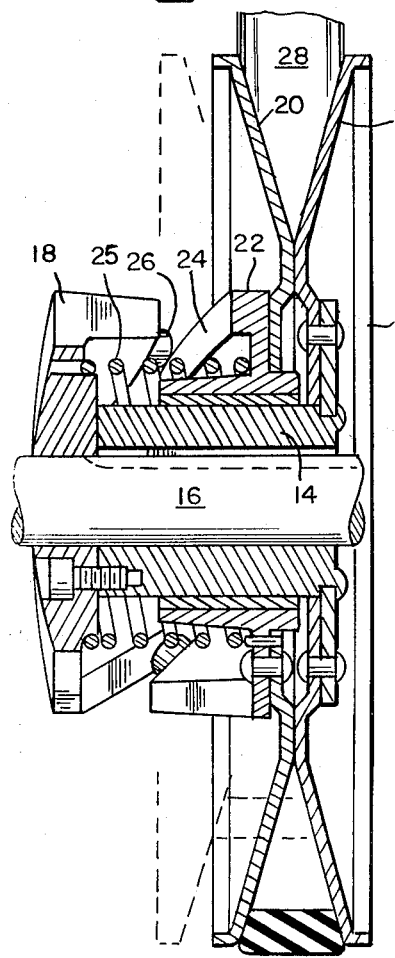
FIG. 2 is an axial section of a driven pulley of the type commonly used with centrifugal driving pulleys.

In the drive mechanism represented in FIGS. 1 and 2, the driven pulley 10 comprises a fixed pulley half 12 carried by a hub 14 fixed on a driven shaft 16 and having a helical cam 18 fixed at its free end. A movable pulley flange 20 is fixed to a hub 22 slidable on the hub 14 and formed with helical cam faces 24 for cooperation with cam follower pads 26 on the cam member 18. The pulley flanges 12 and 20 define a variable width V-groove to receive a belt 28 and are normally urged toward closed position, as shown, by a torsion spring 25 acting between the cam member 18 and the hub 22.

Centrifugal actuation of the speed responsive pulley of FIG. 1 tends to pull the belt 28 deeper into the V-groove of the driven pulley 10 and force its flanges 12 and 20 apart, with concurrent rotation of the flange 20 relative to the fixed flange 12 so as to cause the helical cam 24 to back off and permit such separation. Increased torque reaction from the output shaft 16 actuates the cams to force the flanges 12 and 20 together, and this increases the drive ratio to permit the power train to handle the increased torque. Further discussion of this torque responsive driven mechanism is to be found in my U.S. Pat. No. 3,625,079.

The high speed variable-ratio pulley shown in FIG. 1 comprises a hollow hub 32 mounted on a power shaft 34 and having a fixed pulley flange 36 fixed to its inner end, at the left in FIG. 1. The elongated hub 32 has a grooved cylindrical portion 38 immediately adjacent the pulley flange 36. Beyond that, a reduced-diameter portion 40 is provided with splines 42 for the reception of the hub 44 of a drive spider 45 having three drive arms 46. A sleeve 41 covers the inner ends of the spline grooves and provides an outer surface in alignment with the surface of the cylindrical portion 38. A further reduced-diameter portion 48 on the elongated hub 32 carries a long sleeve 50 having an outer cylindrical bearing surface. The sleeve 50 having an outer cylindrical bearing surface. The sleeve 50 is held in place by a hollow hub nut 52, with its inner end in abutting relation with the hub 44 of the spider to fix that hub firmly against the end of the sleeve 41 and such sleeve firmly against a shoulder at the end of the cylindrical portion 38. This fixes the drive spider on the hub 32.

A movable pulley flange 56 is mounted between the fixed pulley flange 36 and the spider 45. It has a bearing liner 54 which supports it for sliding movement on the cylindrical bearing surface provided by the hub portion 38 and the sleeve 41. Such surface is desirably grooved to provide clearance for rubber dust from the belt. The inner faces of the two pulley flanges 36 and 56 form a variable width V-groove for reception of the drive belt 28 to transmit drive to the driven pulley shown in FIG. 2.

Figure 4:
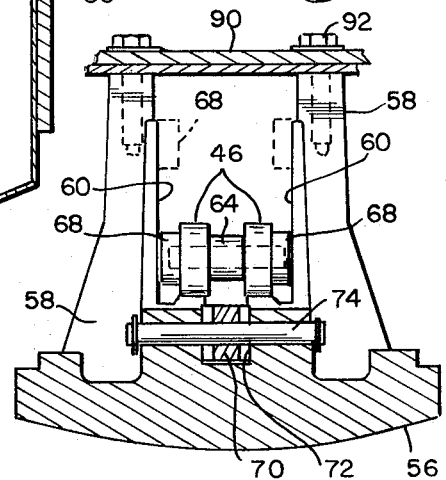
FIG. 4 is a section on the line 4—4 of FIG. 3.
Figure 3:
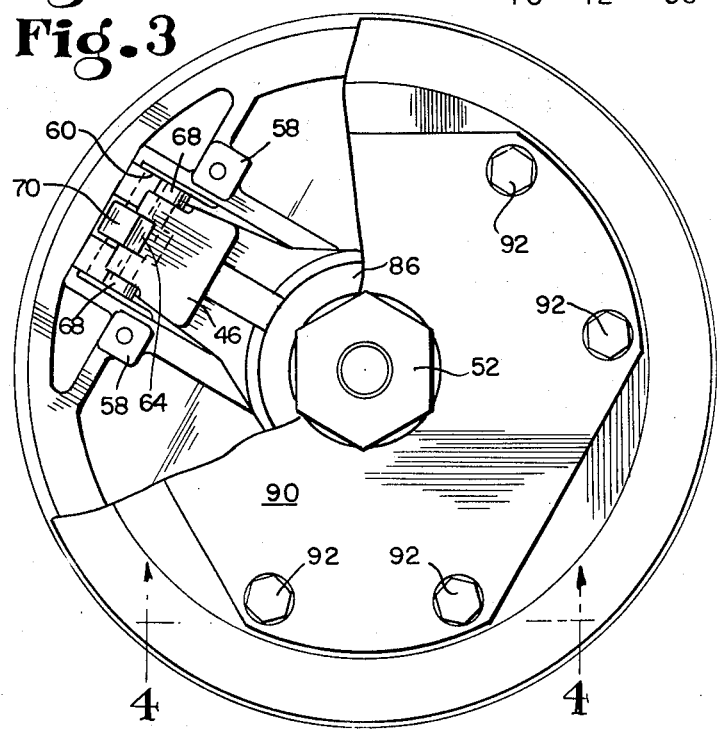
FIG. 3 is an end elevation of the variable ratio pulley of FIG. 1, with parts broken away.

The rear face of the movable pulley flange 56 carries three pairs of spaced drive posts 58. The two posts of each pair are formed with opposed flat guide faces 60 which define the sides of a guideway. The arms 46 of the spider are each received between a pair of such guide faces 60. Each drive arm 46 of the spider 45 is provided with a central slot 62 for the reception of a cam-following roller 64 mounted on a pin 66. The ends of each pin 66 carry bearing caps 68 (FIGS. 3 and 4) which bear against the guide faces 60 of the drive posts 58. This limits relative movement of the posts 58 and the driven pulley flange 56 with respect to the spider arms 45 to non-rotative axial sliding movement, and the movable pulley flange is thereby connected to be driven rotatively by the spider 45 fixed on the hub 32 but is free to move axially along the hub and relative to the spider 45 to vary the width of the pulley groove.

A centrifugal cam lever 70 is pivoted in a central slot 72 between bosses at the base of each pair of drive posts 58, on a pivot pin 74 which may lie at a greater radial distance from the hub 32 than the roller pin 66. Each cam lever 70 is located to swing outward under centrifugal force against a roller 64, and to thereby generate axial thrust on the cam pivot 74 to force the driven pulley flange 56 toward the fixed pulley flange 36. Thrust reaction is along a thrust line extending horizontally across the axis of the roller 64. The movable pulley flange 56 is shown in fully open position in full lines in FIG. 1, and the cam lever 70 is shown in fully retracted position. Under centrifugal force, the cam lever 70 swings counterclockwise against the roller 64 to cause the pulley flange 56 to move to the left toward and to its fully closed position. Such fully closed position of the flange and the corresponding position of the cam lever 70 are shown in dotted lines in FIG. 1.

To contribute to safety and prevent undue stress on the movable pulley flange 56, the end of the cam lever 70 is desirably provided with a reversely curved section 76 which at a predetermined end point of movement of the lever engages the surface of the roller 64 in such manner that any further centrifugal force is taken radially by the roller 64 and the spider 45, and generates no further axial thrust on the movable pulley flange 56. At this predetermined point in the movement of the cam levers, the pulley flange 56 is desirably at a predetermined point short of abutting relation with the fixed pulley flange 36, and with a slight clearance therebetween as shown at 37 in FIG. 1. The reversely curved surface 76 of the cam lever 70 acts as a stop against the roller 64 and prevents further centrifugal movement of the lever 70.

To strengthen the structure, the posts 58 are tied together at their free ends. As shown, the rear or outer ends of the posts 58 on the movable pulley flange 56 are extended beyond the guide faces 60 sufficiently to give full clearance for relative movement of the spider 45, and their ends are dressed to fit tight against the end wall 78 of a formed steel bell housing 80. This has an outer wall 82 with an edge 83 fitted in a rabbet groove 84 at the periphery of the movable pulley flange 56. The housing extends as a continuous casing from that periphery rearward and inward to a central opening closely surrounding the bearing sleeve 50, where it is supported by a flanged bearing ring 86 slidable on the surface of the bearing sleeve 50. A tie plate 90 lies against the outer surface of the housing end wall 78 and is also supported on the flanged bearing ring 86. The tie plate 90 and the end wall 78 of the housing 80 are both firmly bolted to the ends of the drive posts 58, by bolts 92. This ties all six drive posts 58 together at their free ends and greatly strengthens the post structure against bending and failure under high centrifugal force. The plate and end wall also firmly support the ends of the posts 58 from the bearing ring 86, and the housing 80 extends that support to the periphery of the movable flange, which firmly braces the movable pulley flange 56 against distortion and tilting under the eccentric loading exerted by the belt. The steel housing 80 also provides an encasement which itself strongly resists centrifugal failure and also serves to contain any loose parts of the actuating mechanism which may break in service.

The movable pulley flange 56 forms a movable assembly with the posts 58, the housing 80, the end plate 90, and the bearing ring 86, which assembly is movable as a whole along the hub 32. The flange of the hub nut 52 forms a stop for outward movement of the assembly, and the assembly is normally urged against that stop, to the right in FIG. 1, by a spring 94 compressed between the flange of the bearing ring 86 and the hub 44 of the spider. The spring tends to open the V-groove to its widest condition in which the belt 28 lies free between the two pulley flanges 36 and 56. The assembly strongly supports the movable flange 56 and is itself firmly supported against tilting by the straddle bearing arrangement of the inboard bearing sleeve 54 at the inner end of the assembly and the outboard bearing ring 86 at the outer end of the assembly.

The pulley hub 32 has a tapered seat for centered mounting on a tapered section of the power shaft 34, and is held in place on that shaft by a shaft nut 96 threaded on the end of an extension of the shaft 34.

The improvements in safety against centrifugal failure provided by the tie plate 90 and its relation to the other parts, and the improvements in operation, are obtained without imposing difficulties in the construction or assembly of the mechanism. Thus, the movable pulley flange 56 and the posts 58 and the mounting for the pivot pins 74 are readily made as integral parts of a single casting which can be cast in a two-part mold or die, and such casting can be made in a configuration which requires a minimum of machining to provide the guide faces 60 and the pivot pin holes for the pins 74.

Operation is as follows. The speed-responsive variable-ratio pulley of FIG. 1 is normally held in wide-groove condition, as shown in full lines in FIG. 1, in which the belt 28 is free between the pulley flanges and a declutched condition exists which permits idling operation of the engine shaft 34 without transmitting drive. As the speed of the shaft is increased, the centrifugal cam levers 70 act as centrifugal weights and swing outward against the rollers 64 at the ends of the spider arms 46. This generates axial thrust between the rollers 64 at the ends of the spider arms 46 and the pivot pins 74 on the movable flange 56 to move the flange 56 toward closed position, and drive engagement with the belt 28 then occurs. As speed increases, the groove between the pulley flanges is progressively decreased in width, and the belt 28 moves outward toward and to the dotted line position shown in As the belt is forced outward in the speed responsive pulley of FIG. 1, it is pulled inward in the driven pulley 10 shown in FIG. 2. This causes the pulley flange 20 to move to the left in FIG. 2 and to rotate relative to the fixed pulley flange 12 against the tension of the spring 25 and the action of the cams 24-26. In the event of increased torque on the driven shaft 16, the action of the cam 24 forces the movable flange 20 back toward the fixed flange 12 to reduce the width of the groove and force the belt 28 outward. This pulls the belt inward in the speed responsive pulley of FIG. 1, which opposes and partially overcomes the thrust generated by centrifugal force acting on the levers 70 and causes the movable flange 56 to move to the right in FIG. 1. Drive conditions will vary in the two pulleys in this manner depending upon the speed of the pwoer shaft 34 and the torque at the driven shaft 16.

At all speeds, and especially at high speeds which generate high centrifugal forces on the posts and other parts of the variable ratio pulley mechanism, the tie plate 90 and the end walls 78 will strongly tie the ends of the posts 58 together to resist failure under such centrifugal forces. In the event of any failure, the strong ductile steel housing 80 will contain loose parts and prevent them from being thrown outward to damage other parts of the machine or to injure persons nearby.

At high speeds, the reverse curve stop sections 76 on the cam levers 70 will limit the outward swinging travel of the levers 70 and prevent further generation of thrust against the movable pulley flange 56 after it has reached fully closed position, and before it comes into abutting engagement with the fixed pulley flange 36. This will prevent the imposition of distortion forces on that movable pulley flange or on the spider arms which would contribute to their failure under the high speed conditions.

Figures 5, 9:
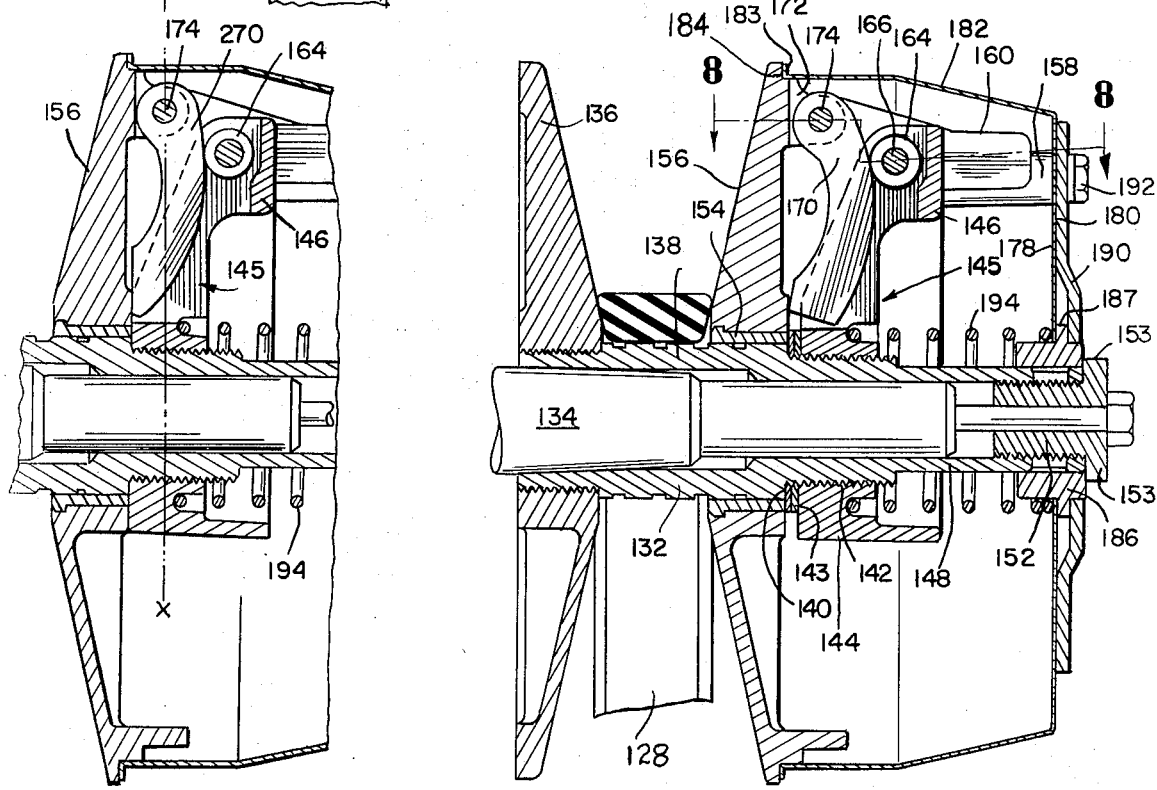
FIG. 5 is an axial section of a modified variable ratio driver pulley embodying the invention, showing the pulley in its normal open position.
FIG. 9 is a section like FIG. 5 but showing the spider repositioned to accommodate a modified form of centrifugal cam lever.

The modified variable-ratio drive or pulley shown in FIGS. 5-9 comprises a hollow hub 132 mounted on a power shaft 134 and having a fixed pulley flange 136 fixed to its inner end, at the left in FIG. 5. The hub 132 has a generally cylindrical portion 138 forming a bearing surface which edtends to a shoulder 140, beyond which the hub has a threaded reduced section for the reception of the hub 144 of a drive spider 145 having three drive arms 146. A further reduced-diameter portion 148 forms an outer cylindrical bearing surface. The outer end of the hub is internally threaded for the reception of a hollow hub nut 152 having a wide flange 153 projecting beyond the cylindrical surface of the reduced portion 148.

The spider 145 is threaded onto the threaded portion 142 of the hub against a pair of spacer rings 143 of a predetermined thickness. These determine the relative axial positions of the spider and the movable pulley flange when the latter is in fully retracted position as shown in FIG. 5, and in turn determine the spacing between the cam pivot 174 and cam follower 164 mechanism described below. The rings may be removed or added to to accommodate changes in that cam lever 170 to provide different centrifugal-response characteristics, as shown in FIG. 9.

A movable pulley flange 156 is mounted between the fixed pulley flange 136 and the spider 145. It has a bearing liner 154 which rides on the bearing surface of the hub portion 138. The inner faces of the two pulley flanges 136 and 156 form a variable width V-groove for reception of the drive belt 128 to transmit drive to a driven pulley such as shown in FIG. 2.

Figure 7:
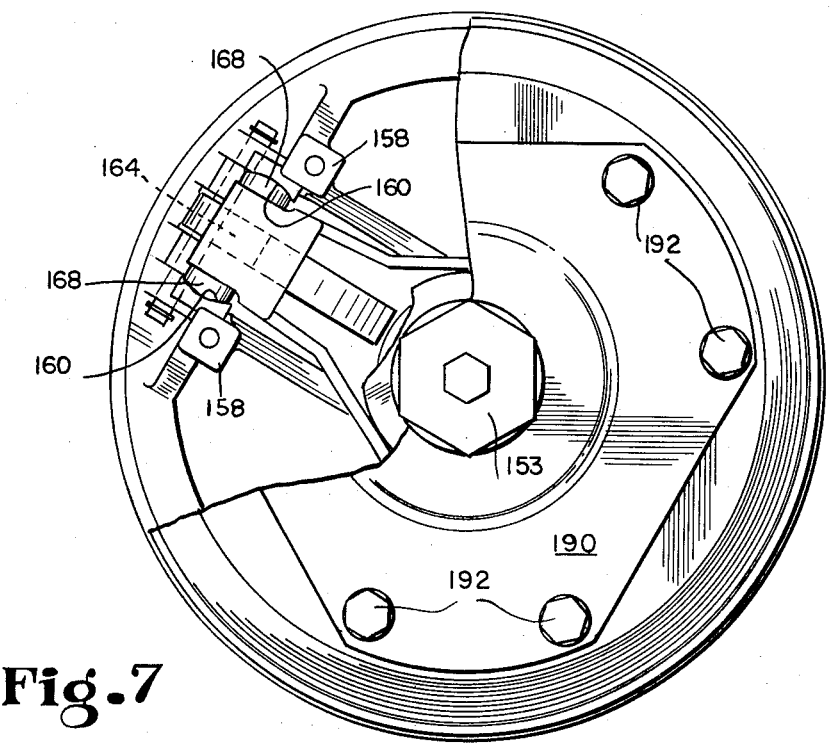
FIG. 7 is an end elevation of the pulley shown in FIG. 5, with the cover broken away to show one pair of drive posts in end elevation.
Figure 8:
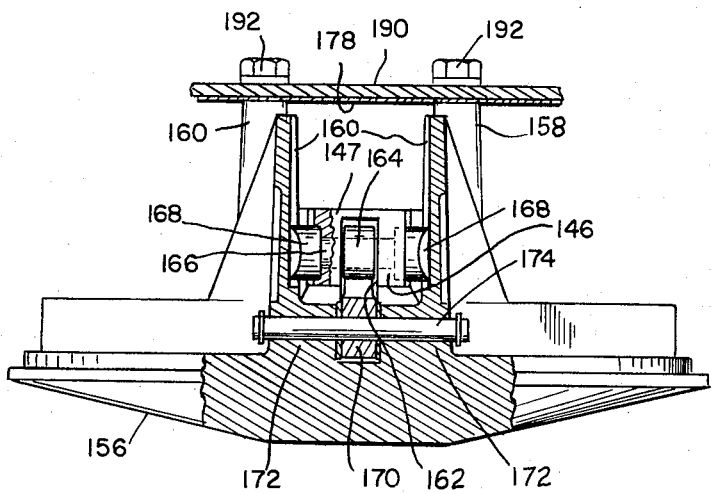
FIG. 8 is a section on the line 8—8 of FIG. 5.

The rear face of the movable pulley flange 156 carries three pairs of spaced drive posts 158. The two posts of each pair are formed with opposed internal guide ways 160 in the form of concave shallow grooves of arcuate cross section. The arms 146 of the spider are each received between a pair of such guide ways 160, and as shown in FIGS. 7 and 8, are formed with shallow recesses for the reception of bearing pads 168 which are shaped with cylindrical bearing faces mating with the ways 160. Each drive arm 146 is provided with a central slot 162 for the reception of a cam-following roller 164 mounted on a transverse pin 166 trapped in a bore between the bearing pads 168. The spider arms 145 are in torque transmitting relation with the drive posts 158 and through them with the driven pulley flange 156, while the posts 158 and the movable pulley flange are free to slide axially with respect to the spider 145 and along the cylindrical portion 138 of the hub 132, and thereby vary the width of the pulley groove.

A centrifugal cam lever 170 is pivoted in a central slot between bosses 172 at the base of each pair of drive posts 158 on the movable pulley flange, on a pivot pin 174 which may lie at a greater radial distance from the hub 132 than the roller pin 166. Each cam lever 170 normally extends inward from and is partly tucked under its pivot pin 174, and swings outward therefrom under centrifugal force against the roller 164. It thereby generates axial thrust on its pivot 174 to force the driven pulley flange 156 toward the fixed pulley flange 136. Thrust reaction is taken by the roller 164 and its pin 166 in the spider arm 146, which remains axially stationary as the pulley flange 156 moves from its fully open position as shown in FIG. 5.

The rear ends of the drive posts 158 are all tied together by the end wall 178 of a bell housing 180 and by a tie plate 190 lying against such end wall. Both the wall and the plate extend inward to a central opening where they are supported by a flanged outboard bearing 186. This has a peripheral flange 187 trapped between the offset inner edge of the tie plate 190 and the edge of the end wall 178. The tie plate 190 and end wall 178 are both firmly bolted to the ends of the drive posts 158 by bolts 192, and this ties each pair of drive posts to each other and to the other posts. The bell housing 180 has a side wall 182 which extends forward to the periphery of the movable pulley flange 156 and has its edge 183 received in a rabbet groove 184 at that periphery. The housing thus extends as a continuous casing about the entire centrifugal mechanism, and supports the pulley flange from the outboard bearing 186.

The movable pulley flange 156 forms a movable assembly with the posts 158, the housing 180, the end plate 190, and the bearing ring 186, which assembly is movable as a whole along the hub 132. The assembly is normally urged to the right in FIGS. 5 and 6 by a spring 194 compressed between the outboard bearing 186 and the hub 144 of the spider. The spring tends to retract the movable flange 156 and open the pulley groove to its widest condition as shown in FIG. 5, in which the belt 128 lies free between the two pulley flanges 136 and 156, as in the previous modification. The assembly strongly supports the movable flange 156 and is itself firmly supported against tilting by the straddle bearing arrangement of the inboard bearing sleeve 154 at the inner end of the assembly and the outboard bearing 186 at the outer end of the assembly.

Figure 6:
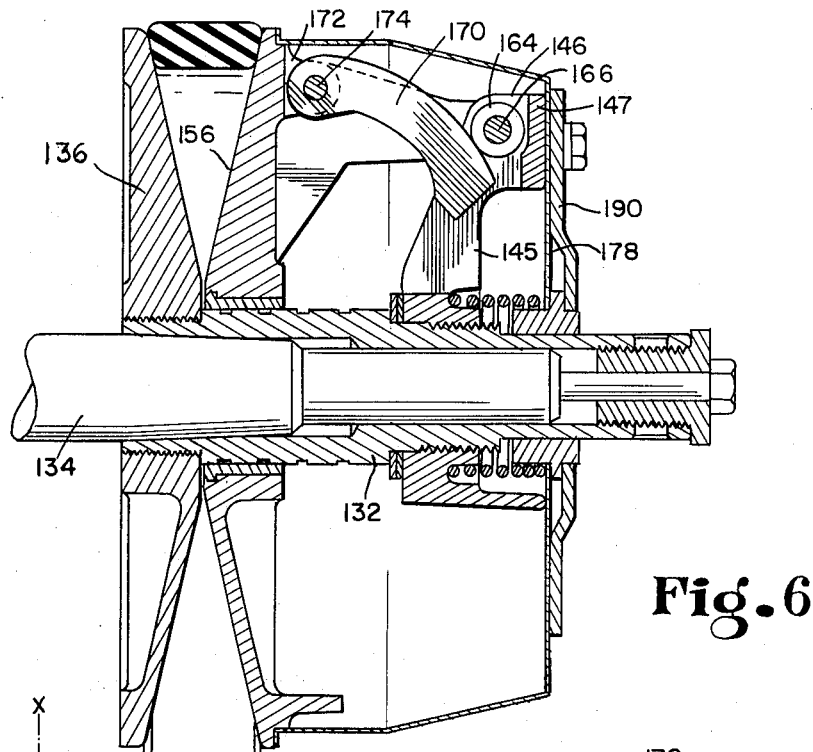
FIG. 6 is an axial section like FIG. 5 but showing the pulley in cam-actuated closed position.

In this modification, the length of the posts 158 are inter-related to the length of travel movement of the movable assembly from the fully open position of the pulley as shown in FIG. 5 to the fully closed position of the pulley as shown in FIG. 6. In FIG. 6, the movable pulley flange 156 has moved inward to the limit of its movement, where it lies close to the fixed pulley flange 136 and forms a pulley groove of minimum width. In this condition, the inner periphery of the movable pulley flange 156 stands clear of the inner periphery of the fixed pulley flange 136, and the inward movement of the movable assembly stops short of carrying those inner peripheries into abutting relation. Further movement of the movable flange assembly toward the fixed flange is prevented by engagement of the rear housing wall 178 with stop pads 147 formed at the outer ends of the spider arms 146. The areas of the wall 178 which engage as a stop against the pads 147 are areas which are backed by the tie plate 190 and at which both the wall and the plate are strongly supported as bridges between the ends of the posts which form the guide ways for the spider arms.

The stop means thus provided are particularly well located to protect the structure from damaging stress. The movement of the movable pulley assembly toward stopped position as shown in FIG. 6 is actuated by thrust generated by the centrifugal movement of the cam levers 170 about their pivots 174 against the cam follower rollers 146. After the assembly has reached its stopped position, additional centrifugal action on each cam lever 170 can, of course, produce additional thrust tending to produce additional movement. Such additional thrust tending to produce additional movement. Such additional thrust will be taken, at the left, by the pivot pin 174, which will transmit the thrust to the supporting bosses 172 at the base of the pair of posts 158 which straddle the centrifugal lever 170. At the right, the excess thrust will be taken by the roller pin 166 and transmitted therefrom directly to the stop pad 147 at the end of the spider arm 146, which will transmit the thrust directly to the end wall 178 and tie plate 190 in that area thereof which lies between and is solidly secured to the pair of posts 158. Accordingly, the excess thrust force will be transmitted almost directly to the opposite ends of the pair of posts 158 which lie close beside and straddle the thrust creating cam mechanism. The lines of axial thrust on the pivot pin 174 and the roller pin 166 will be in opposite directions, and will be only slightly offset from each other in a radial direction, and both will lie close to the structure of the posts 158. Accordingly, substantially the entire effect of the excess thrust will be to stress the posts 158 in tension, and the thrust will produce little or no bending stress on any parts of the mechanism. In particular, the excess axial thrust will produce no bending stress on the movable pulley flange 156, since the only points of contact of that flange with the stress system will be at pins 174 in the heavy bosses at the base of the posts. Likewise, the excess thrust will not produce bending stresses in the spider 145, since the thrust will be transmitted directly from the pins 166 to the stop pads 147. While the camming action of the levers 170 will also exert radial force on the rollers 164, this will be taken substantially entirely by the spider arms in tension, and will produce little or no bending stress.

Operation of the modification of FIGS. 5–8 is similar to that of FIGS. 1–4. The pulley is normally held in wide-groove condition as shown in FIG. 5 in which the belt is free between the pulley flanges and in declutched condition. As the shaft speed is increased, the centrifugal cam levers 170 will swing outward against the rollers 164 in the spider arm 146, and will thrust the movable pulley flange 156 to the left away from the fixed spider arms 146 and toward closed position as shown in FIG. 6. Initial movement carries the pulley flanges into engagement with the belt and as speed increases, the groove between the pulley flanges is progressively narrowed and the belt 128 is moved outward to its maximum position shown in FIG. 6. It is assumed that the belt is connected to a driven pulley such as a pulley shown in FIG. 2, where it produces the same action as described in connection with the modification of FIGS. 1–4. At all speeds, and especially at high speeds which generate high centrifugal forces on the posts 158 and other parts of the variable ratio pulley mechanism, all parts of the structure are strongly tied together to resist failure under centrifugal force. When high speed has carried the movable pulley flange 156 to fully closed position as shown in FIG. 6, any additional centrifugal force produced by still higher speeds will of course produce additional thrust. But that thrust will be contained and transmitted directly to the posts 158 to produce stress in tension and will not be transmitted to other parts to produce bending stress.

FIG. 9 shows a modification of the structure of FIGS. 5 and 6 for purposes of special application, as to provide a racing clutch. In this modification of FIG. 9, the spacer rings 143 are omitted from between the shoulder 140 on the hub 132 and the hub 144 of the spider 145. This locates the spider 145 a short distance to the left of its normal position shown in FIG. 5, relative to the fully open position of the movable pulley flange 156. This repositioning of the spider 145 moves the cam follower rollers 164 likewise to the left a short distance. The cam levers 270 used are different from the levers 170 shown in FIGS. 5 and 6. The lever 270 is generally similar in shape to the lever 170, but has its lower end cut away so that it can be swung farther clockwise to a position in which its center of mass lies closer to the center line x—x passing through the axis of the supporting pin 174. By this change and by changes in the weight of the cam lever, the centrifugal speed-responsive action of the clutch can be varied, for example, to greatly increase the speed at which the pulley engages the belt and also to produce different drive characteristics for the drive mechanism.

I claim:

1. A high-speed variable-ratio pulley, comprising a fixed pulley flange defining one side of a V-groove and adapted to be fixed coaxially on a shaft,
   a movable pulley flange defining the opposite side of the V-groove, slidable axially of the shaft to vary the width of the V-groove,
   a plurality of pairs of drive posts extending rearward from adjacent the periphery of the movable pulley flange,
   a fixed drive spider behind the movable pulley flange and having a plurality of drive arms each received between the posts of a pair of posts in axially-slidable, torque-transmitting relation with said posts for transmitting drive torque between ends of the spider arms and the movable pulley flange,
   centrifugal means located between the posts of each pair and acting between a point on the movable pulley flange at the base of said posts and the drive arm received therebetween to urge such pulley flange away from the arm and thereby urge the pulley flanges together,
   an inboard bearing between the movable pulley flange and the shaft and an outboard bearing about the shaft outward of the fixed spider,
   wherein the improvement comprises
   a tie plate fixed to the ends of the several pairs of drive posts and to the outboard bearing, to tie the ends of the posts of each pair together and to the other posts and the outboard bearing, to reinforce the posts against centrifugal failure and form a connection from said outboard bearing through the posts to brace the movable pulley flange against tilting movement on the shaft.

2. A high speed variable-ratio pulley as in claim 1 in which
   said fixed pulley flange is fixed to an elongated hub adapted to be fixed on a shaft,
   said inboard and outboard bearings are slidably received on bearing surfaces carried by said hub,
   and said spider is fixed on said hub between the movable pulley flange and the outboard bearing.

3. A variable ratio pulley as in claim 2 which includes a bell housing of steel or like strong ductile material fixed to the drive posts and tie plate and extending therefrom to the movable pulley flange to enclose the drive mechanism.

4. A variable-ratio pulley as in claim 1 with the addition of stop means to stop the action of the centrifugal means at a predetermined relative position of the pulley flanges and thereby prevent further thrust on the movable pulley beyond said position.

5. A variable ratio pulley as in claim 4 in which said centrifugal means comprises cam followers on the spider arms or the movable pulley flange and centrifugal cam levers pivoted to the other thereof and movable by centrifugal force against the followers to generate axial thrust urging the pulley flange away from the spider, and said stop means comprises means to stop centrifugal movement of the cams beyond a predetermined position relative to the followers and thereby prevent thrust on the movable flange beyond a predetermined position of the movable pulley flange relative to the fixed pulley flange.

6. A variable ratio pulley as in claim 5 in which said cam followers are rollers and said cam levers swing outward against the rollers and thereby produce axial thrust on the movable pulley flange, and said stop means include shaped portions on the cams for radially engaging the rollers to stop further centrifugal movement of the cams.

7. A variable ratio pulley as in claim 4 in which said centrifugal means comprises cam followers on the spider arms or the movable pulley flange and centrifugal cam levers on the other thereof and movable by centrifugal force against the followers to generate axial thrust urging the pulley flange away from the spider, the portions of said tie plate connecting the posts of each pair being positioned to engage the spider arm disposed between such posts as the movable pulley flange and its connected parts move to said predetermined position relative to the fixed pulley flange so as to stop further movement thereof and form said stop means.

8. A variable ratio pulley as in claim 7 in which each set of cam follower and cam lever is positioned substantially between and in line with a pair of posts and generates axial thrust along thrust lines between or close to said posts so that when said stop means is engaged, additional thrust generated by said centrifugal means will be transmitted directly to said posts to stress the same in tension, substantially without imposing bending stress on the posts or other parts of the mechanism.

9. A high speed variable-ratio pulley as in claim 1 in which said centrifugal means comprises cam followers on the spider arms or the movable pulley flange and centrifugal levers pivoted to the other thereof and having an inward-extending normal position from which they are movable by centrifugal force against the followers to generate axial thrust urging the pulley flange away from the spider, there being positioning means at the hub of the spider and engageable by the movable pulley flange to determine the relative axial positions of said spider and flange in the fully retracted position of the latter, said positioning means being variable to vary said relative positions and thereby vary the spacing between the cam followers and the pivot mountings of the cam levers to accommodate cam levers of different centrifugal-response characteristics.

10. A high speed variable ratio pulley as in claim 9 in which said position means comprises a spacer ring between the spider hub and a shoulder on the hub of the fixed pulley flange.

11. A high speed variable ratio pulley as in claim 1 in which said drive posts define guide ways in the form of opposed axially extending concave grooves of cylindrical configuration, and said drive arms are fitted with bearing pads having cylindrical outer faces mating with said concave grooves.

* * * * *